United States Patent
Li et al.

(10) Patent No.: US 10,189,013 B2
(45) Date of Patent: Jan. 29, 2019

(54) MONOLITHIC CATALYST COMPRISING MOLECULAR SIEVE MEMBRANE AND METHOD FOR PREPARING THE MONOLITHIC CATALYST

(71) Applicant: WUHAN KAIDI ENGINEERING TECHNOLOGY RESEARCH INSTITUTE CO., LTD., Wuhan (CN)

(72) Inventors: Changyuan Li, Wuhan (CN); Qianqian Liu, Wuhan (CN); Dechen Song, Wuhan (CN); Weiguang Yang, Wuhan (CN); Xiaodong Zhan, Wuhan (CN); Jiaqi Jin, Wuhan (CN); Yanfeng Zhang, Wuhan (CN)

(73) Assignee: WUHAN KAIDI ENGINEERING TECHNOLOGY RESEARCH INSTITUTE CO., LTD., Wuhan (CN)

( * ) Notice: Subject to any disclaimer, the term of this patent is extended or adjusted under 35 U.S.C. 154(b) by 255 days.

(21) Appl. No.: 15/186,583

(22) Filed: Jun. 20, 2016

(65) Prior Publication Data

US 2016/0288104 A1    Oct. 6, 2016

Related U.S. Application Data

(63) Continuation-in-part of application No. PCT/CN2014/091398, filed on Nov. 18, 2014.

(30) Foreign Application Priority Data

Dec. 18, 2013  (CN) .......................... 2013 1 0695773

(51) Int. Cl.

| | |
|---|---|
| *B01J 23/00* | (2006.01) |
| *B01J 23/89* | (2006.01) |
| *C10G 2/00* | (2006.01) |
| *B01J 37/02* | (2006.01) |
| *B01J 29/03* | (2006.01) |
| *B01J 35/04* | (2006.01) |
| *B01J 29/70* | (2006.01) |
| *B01J 37/06* | (2006.01) |
| *B01J 37/34* | (2006.01) |
| *B01J 35/02* | (2006.01) |

(52) U.S. Cl.
CPC ......... *B01J 23/894* (2013.01); *B01J 29/0333* (2013.01); *B01J 29/70* (2013.01); *B01J 35/04* (2013.01); *B01J 37/0217* (2013.01); *B01J 37/0225* (2013.01); *B01J 37/0242* (2013.01); *B01J 37/06* (2013.01); *B01J 37/343* (2013.01); *C10G 2/332* (2013.01); *C10G 2/333* (2013.01); *C10G 2/334* (2013.01); *B01J 35/023* (2013.01); *B01J 2229/66* (2013.01); *B01J 2523/00* (2013.01)

(58) Field of Classification Search
CPC ........ B01J 23/894; B01J 37/06; B01J 37/343; B01J 29/70; B01J 37/0225; B01J 37/0242; B01J 29/0333; B01J 37/0217; B01J 35/04; B01J 35/023; B01J 2523/00; B01J 2229/66; C10G 2/333; C10G 2/334; C10G 2/332
USPC ......................................................... 502/302
See application file for complete search history.

(56) References Cited

U.S. PATENT DOCUMENTS

2010/0140138 A1\* 6/2010 Chaumonnot ......... B01J 29/005
                                                            208/119

OTHER PUBLICATIONS

Ogawa et al. "Preparation of Aluminum-Containing Mesoporous Silica Film" Langmuir 2002, 18, 744-749 (Year: 2001).\*
Yuranov et al "Structured combustion catalysts based on sintered metal fibre filters" Applied Catalysis B: Environmental 43 (2003) 217-227 (Year: 2002).\*

\* cited by examiner

*Primary Examiner* — Haytham Soliman
(74) *Attorney, Agent, or Firm* — Matthias Scholl P.C.; Matthias Scholl

(57) ABSTRACT

A monolithic catalyst, including cobalt, a metal matrix, a molecular sieve membrane, and an additive. The metal matrix is silver, gold, copper, platinum, titanium, molybdenum, iron, tin, or an alloy thereof. The molecular sieve membrane is mesoporous silica SBA-16 which is disposed on the surface of the metal matrix and is a carrier of the active component and the additive. The thickness of the carrier is between 26 and 67 μm. The additive is lanthanum, zirconium, cerium, rhodium, platinum, rhenium, ruthenium, titanium, magnesium, calcium, strontium, or a mixture thereof. A method for preparing the monolithic catalyst is also provided.

14 Claims, No Drawings

MONOLITHIC CATALYST COMPRISING MOLECULAR SIEVE MEMBRANE AND METHOD FOR PREPARING THE MONOLITHIC CATALYST

CROSS-REFERENCE TO RELATED APPLICATIONS

This application is a continuation-in-part of International Patent Application No. PCT/CN2014/091398 with an international filing date of Nov. 18, 2014, designating the United States, now pending, and further claims priority benefits to Chinese Patent Application No. 201310695773.1 filed Dec. 18, 2013. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The invention relates to a monolithic catalyst for Fischer-Tropsch synthesis and a method for preparing the same.

Description of the Related Art

Conventional catalysts for Fischer-Tropsch synthesis employ molecular sieves as a carrier and are in the form of powders. However, in the catalytic process, the pressure drop across the catalyst bed is relatively large, which means that powder catalysts are not suitable for the fixed-bed reactor.

In addition, industrial catalysts are required to be spherical, cylindrical, in a cloverleaf pattern, or gear wheel-shaped. To meet this requirement, molecular sieve powders must be reshaped, which tends to damage the porous structure of the powders and thus reduces the catalytic performance of the catalysts.

SUMMARY OF THE INVENTION

In view of the above-described problems, it is one objective of the invention to provide a monolithic catalyst for Fischer-Tropsch synthesis and a method for preparing the same. The monolithic catalyst comprises a molecular sieve membrane in-situ growing on the surface of metal matrix. The molecular sieve membrane is used as a carrier for cobalt as an active component and an additive.

To achieve the above objective, in accordance with one embodiment of the invention, there is provided a monolithic catalyst for Fischer-Tropsch synthesis, comprising cobalt, a matrix, a molecular sieve membrane, and an additive. The matrix comprises at least one metal selected from the group consisting of silver, gold, copper, platinum, titanium, molybdenum, iron, and tin. The metal matrix is preprocessed, and the molecular sieve membrane is mesoporous silica SBA-16 which is disposed on a surface of the metal matrix and is a carrier of the cobalt and the additive. A thickness of the carrier is between 26 and 67 μm. The additive is lanthanum, zirconium, cerium, rhodium, platinum, rhenium, ruthenium, titanium, magnesium, calcium, strontium, or a mixture thereof.

In a class of this embodiment, the thickness of the carrier is between 30 and 60 μm.

The invention also provides a method for preparing the monolithic catalyst, comprising:

1) washing a plurality of honeycomb metal matrixes having uniform sizes using deionized water; and drying the metal matrixes in an oven at 100° C.;
2) dissolving molecular sieve powders of mesoporous silica SBA-16 in absolute ethanol to yield a mixture; oscillating the mixture for 20 to 30 min using an ultrasonic oscillation method to form a uniformly distributed soak solution of the molecular sieve powders; soaking the metal matrixes in the soak solution for 1 to 10 s; taking the metal matrixes out, and when the soak solution on the metal matrixes stops flowing and dripping down, soaking the metal matrixes in the soak solution again; repeating the impregnation of the metal matrixes, and then drying the metal matrixes in air;
3) placing the metal matrixes in a molecular sieve solution of mesoporous silica SBA-16 and crystallizing the mesoporous silica SBA-16 for 5 to 120 hrs at a temperature of between 70 and 150° C. in a reaction still; allowing the mesoporous silica SBA-16 to grow in-situ on a surface of the metal matrixes to yield metal matrixes comprising a molecular sieve membrane; taking the metal matrixes comprising the molecular sieve membrane out, washing the metal matrixes comprising the molecular sieve membrane using deionized water, and drying; finally, roasting the metal matrixes comprising the molecular sieve membrane for 4 to 8 hrs at a temperature of between 400 and 600° C.; and
4) soaking the metal matrixes comprising the molecular sieve membrane in a salt solution of the active component of cobalt and the additive for 1 to 20 min; drying the metal matrixes comprising the molecular sieve membrane and aging at room temperature for 3 to 36 hrs; roasting the metal matrixes comprising the molecular sieve membrane for 6 to 12 hrs at a programmed temperature of between 300 and 550° C., then cooling the metal matrixes comprising the molecular sieve membrane to room temperature.

In a class of this embodiment, after the metal matrixes are dried in the oven at 100° C. in 1), the metal matrixes are treated with 0.1 mol/L of hydrochloric acid for 5 to 60 s, washed by deionized water, and dried; then the metal matrixes are treated with 1 mol/L of NaOH, washed by deionized water, and dried; following acid-alkali treatment, the metal matrixes are impregnated in acetone for 0.5 to 1 h, washed by deionized water, and dried; then the metal matrixes are impregnated in hydrogen peroxide for 0.5 to 1 h so as to introduce hydroxyl on the surface of metal matrixes and enhance a durability of the molecular sieve membrane; and then the metal matrixes are washed by deionized water, and dried.

In a class of this embodiment, an soaking process in 2) is repeated for between 1 and 20 time(s).

In a class of this embodiment, a method for preparing the molecular sieve solution of mesoporous silica SBA-16 in 3) comprises: dissolving P123 ($EO_{20}PO_{70}EO_{20}$) and F127 ($EO_{106}PO_{70}EO_{106}$) in deionized water and stirring to yield a mixed solution; adding hydrochloric acid into the mixed solution and stirring at 35±5° C.; then adding TEOS (Si($OC_2H_5$)$_4$) to the mixed solution and stirring for 1 to 1.2 h; a molar ratio of materials in the molecular sieve solution of mesoporous silica SBA-16 is P123:F127:TEOS:HCl:$H_2O$=1:(1-5):(200-800):(1200-3500):(30000-120000).

In a class of this embodiment, by adjusting components of the molecular sieve solution or repeating times of the in-situ growth of the mesoporous silica SBA-16 in 3), the thickness of the molecular sieve membrane is controlled to be between 26 and 67 μm.

Preferably, a method for preparing the molecular sieve solution of mesoporous silica SBA-16 in 3) comprises: dissolving P123 and F127 in deionized water and stirring to yield a mixed solution; adding hydrochloric acid into the mixed solution and stirring at 35±5° C.; then adding TEOS to the mixed solution and stirring for 1 to 1.2 h; a molar ratio of materials in the molecular sieve solution of mesoporous silica SBA-16 is P123:F127:TEOS:HCl:$H_2O$=1:(1-3):(350-650):(1700-3000):(50000-100000).

The monolithic catalyst comprising the molecular sieve membrane on the surface of metal matrix is especially applicable to Fischer-Tropsch synthesis.

The metal matrixes are preprocessed to coarsen the surface of the matrixes, so that the specific surface area is enlarged, and the coarsened surface is beneficial to the in-situ growth of the molecular sieve membrane. The matrixes are impregnated in the soak solution of the molecular sieve powder and the molecular sieve solution of mesoporous silica SBA-16 in order. The molecular sieve solution and positive ions in the molecular sieve solution are beneficial to the nucleation and growth of the mesoporous silica SBA-16, thus the reliable molecular sieve membrane uniformly grows in-situ on the surface of the matrixes. The molecular sieve membrane is resistant to mechanical pressure. Compared with the molecular sieve coating on the surface of the metal matrixes, the molecular sieve which grows in-situ is more reliable.

The method for preparing the monolithic catalyst is easy to operate, applicable to all kinds of metal matrixes, and suitable for industrial production.

Compared with conventional catalysts for Fischer-Tropsch synthesis, advantages of the monolithic catalyst comprising a molecular sieve membrane on the surface of metal matrix according to embodiments of the invention are summarized as follows:

1) The separation of the solid catalyst and the liquid product in a slurry bed reactor is saved.

2) The catalytic reaction of the invention facilitates the uniform distribution of the reactive gas.

3) The special structure of the catalyst that the molecular sieve membrane grows on the surface of the metal matrixes eliminates the diffusion limitation in the porous channel of the catalyst, thus improving the mass transfer effect, and increasing the catalyst activity.

4) The catalyst is easy to prepare in large scale.

5) The catalyst is easy to be regenerated and renewed.

6) The catalyst reduces the pressure drop of the bed layer, so that when being applied to an industrial fixed bed reactor, the catalyst can largely reduce the equipment cost and the operation cost.

DETAILED DESCRIPTION OF THE EMBODIMENTS

For further illustrating the invention, experiments detailing a monolithic catalyst comprising a molecular sieve membrane on the surface of metal matrix for Fischer-Tropsch synthesis and a method for preparing the same are described below. It should be noted that the following examples are intended to describe and not to limit the invention.

The monolithic catalyst comprises cobalt, a matrix, a molecular sieve membrane, and an additive. The matrix comprises at least one metal selected from the group consisting of silver, gold, copper, platinum, titanium, molybdenum, iron, and tin. The metal matrix is preprocessed, and the molecular sieve membrane is mesoporous silica SBA-16 which is disposed on a surface of the metal matrix and is a carrier of the cobalt and the additive. A thickness of the carrier is between 26 and 67 μm. The additive is lanthanum, zirconium, cerium, rhodium, platinum, rhenium, ruthenium, titanium, magnesium, calcium, strontium, or a mixture thereof.

The thickness of the carrier is between 30 and 60 μm.

A method for preparing the monolithic catalyst comprises:

1) Pretreatment of Metal Matrixes:

washing a plurality of honeycomb metal matrixes having uniform sizes using deionized water; and drying the metal matrixes in an oven at 100° C.

2) Implantation of Seed Crystal:

dissolving molecular sieve powders of mesoporous silica SBA-16 in absolute ethanol to yield a mixture; oscillating the mixture for 20 to 30 min using an ultrasonic oscillation method to form a uniformly distributed soak solution of the molecular sieve powders; soaking the metal matrixes in the soak solution for 1 to 10 s; taking the metal matrixes out, and when the soak solution on the metal matrixes stops flowing and dripping down, soaking the metal matrixes in the soak solution again; repeating the impregnation of the metal matrixes, and then drying the metal matrixes in air;

where, a ratio of the mesoporous silica SBA-16 to absolute ethanol is: every 1-10 g of mesoporous silica SBA-16 powder is dissolved in 100 mL of absolute ethanol;

the ratio is not strictly controlled, because when the concentration of the soak solution becomes relatively low, the soaking period can be prolonged, and when the concentration becomes relatively high, the soaking period can be shortened correspondingly; in addition, ethanol can be replaced by water, acetonitrile, etc. as a solvent.

3) In-Situ Growth of Molecular Sieve Membrane:

placing the metal matrixes in a molecular sieve solution of mesoporous silica SBA-16 and crystallizing the mesoporous silica SBA-16 for 5 to 120 hrs at a temperature of between 70 and 150° C. in a reaction still; allowing the mesoporous silica SBA-16 to grow in-situ on a surface of the metal matrixes to yield metal matrixes comprising a molecular sieve membrane; taking the metal matrixes comprising the molecular sieve membrane out, washing the metal matrixes comprising the molecular sieve membrane using deionized water, and drying; finally, roasting the metal matrixes comprising the molecular sieve membrane for 4 to 8 hrs at a temperature of between 400 and 600° C.;

4) Impregnation, Aging and Roasting of Active Component and Additive:

soaking the metal matrixes comprising the molecular sieve membrane in a salt solution of the active component of cobalt and the additive for 1 to 20 min; drying the metal matrixes comprising the molecular sieve membrane and aging at room temperature for 3 to 36 hrs; roasting the metal matrixes comprising the molecular sieve membrane for 6 to 12 hrs at a programmed temperature of between 300 and 550° C., then cooling the metal matrixes comprising the molecular sieve membrane to room temperature.

In the examples, the active component is Co, and the additive is Pt and Ce; a mass ratio Co:Pt:Ce=15%:0.5%:3% in the salt solution.

The metal matrixes are dried in the oven at 100° C. in 1), the metal matrixes are treated with 0.1 mol/L of hydrochloric acid for 5 to 60 s, washed by deionized water, and dried. Then the metal matrixes are treated with 1 mol/L of NaOH, washed by deionized water, and dried. After the acid-alkali treatment, the metal matrixes are impregnated in acetone for 0.5 to 1 h, washed by deionized water, and dried. Then the metal matrixes are impregnated in hydrogen peroxide for 0.5 to 1 h so as to introduce hydroxyl on the surface of metal matrixes and enhance a durability of the molecular sieve membrane. Finally, the metal matrixes are washed by deionized water, and dried.

The soaking process in 2) is repeated for between 1 and 20 time(s). Preferably, the soaking process is repeated for between 2 and 20 times.

The method for preparing the molecular sieve solution of mesoporous silica SBA-16 in 3) comprises: dissolving P123 and F127 in deionized water and stirring to yield a mixed solution; adding hydrochloric acid into the mixed solution and stirring at 35±5° C.; then adding TEOS to the mixed solution and stirring for 1 to 1.2 h. A molar ratio of materials in the molecular sieve solution of mesoporous silica SBA-16 is P123:F127:TEOS:HCl:$H_2O$=1:(1-5):(200-800):(1200-3500):(30000-120000).

Components of the molecular sieve solution are adjustable, and the in-situ growth is repeated in 3) to control the thickness of the carrier that is the molecular sieve membrane on the surface of the metal matrixes to be between 26 and 67 μm.

Preferably, a method for preparing the molecular sieve solution of mesoporous silica SBA-16 in 3) comprises: dissolving P123 and F127 in deionized water and stirring to yield a mixed solution; adding hydrochloric acid into the mixed solution and stirring at 35±5° C.; then adding TEOS to the mixed solution and stirring for 1 to 1.2 h. A molar ratio of materials in the molecular sieve solution of mesoporous silica SBA-16 is P123:F127:TEOS:HCl:$H_2O$=1:(1-3):(350-650):(1700-3000):(50000-100000).

Example 1

1. Pretreatment of Metal Matrixes

A plurality of stainless steel honeycomb matrixes which were cylinders of φ18*30 mm were washed by deionized water and dried in an oven at 100° C. The metal matrixes were treated with 0.1 mol/L of hydrochloric acid for 10 s, washed by deionized water, and dried. Then the matrixes were treated with 1 mol/L of NaOH, washed by deionized water, and dried. After the acid-alkali treatment, the metal matrixes were impregnated in acetone for 1 h, washed by deionized water, and dried. Then the metal matrixes were impregnated in hydrogen peroxide for 1 h so as to introduce hydroxyl on the surface of metal matrixes and enhance a durability of the molecular sieve membrane. Finally, the metal matrixes were washed by deionized water, and dried.

2. Implantation of Seed Crystal 2 g of SBA-16 mesoporous molecular sieve was dissolved in 200 mL of absolute ethanol to yield a mixture. The mixture was oscillated for 20 to 30 min using an ultrasonic oscillation method to form a uniformly distributed soak solution of molecular sieve powder. The metal matrixes were impregnated in the soak solution for 1 to 10 s and then taken out. When the soak solution on the metal matrixes stopped flowing and dripping down, the metal matrixes were impregnated again in the soak solution. The soaking process was repeated for a total of 20 times. Then, the metal matrixes were dried in air.

3. Primary In-Situ Growth of Molecular Sieve Membrane 5 g of P123 ($EO_{20}PO_{70}EO_{20}$, M=5800) and 11.8 g of F127 ($EO_{106}PO_{70}EO_{106}$, M=12600) were dissolved in 1400 mL of deionized water and stirred at a constant temperature of 35° C. to yield a mixed solution. 200 mL of 37 wt. % of hydrochloric acid was added into the mixed solution and stirred at 35° C.; then 65 mL of TEOS ($Si(OC_2H_5)_4$, M=208.33) was added to the mixed solution and stirred for 1 h to prepare the molecular sieve solution of mesoporous silica SBA-16. The preprocessed metal matrixes were fixed by a Teflon standoff and placed into a Teflon bottle. The molecular sieve solution of mesoporous silica SBA-16 was transferred to the Teflon bottle. The reaction still was sealed and rested for 24 hrs at 35° C. Then the mesoporous silica SBA-16 was crystalized for 24 hrs at 80° C. The reaction still was cooled and the metal matrixes comprising molecular sieve membrane were taken out.

The metal matrixes comprising molecular sieve membrane were washed by deionized water to PH=7, dried for 12 hrs in the oven at 100° C., and cooled in air.

Finally, the metal matrixes comprising molecular sieve membrane were roasted in a muffle furnace. In the furnace, the temperature was heated to 400° C. at a speed of 1° C./min and kept for 1 h; Then the temperature was heated to 550° C. at a speed of 1° C./min and kept for 4 hrs; after that, the temperature was decreased to the room temperature at a speed of 0.5° C./min.

The thickness of the molecular sieve membrane on the surface of the metal matrixes is 26 μm under scanning electron microscopy.

4. Impregnation, Aging and Roasting of Active Component and Additive 14.81 g of $Co(NO_3)_2.6H_2O$, 0.16 g of dinitroso diammineplatinum, and 1.86 g of $Ce(NO_3)_3.6H_2O$ were dissolved in deionized water to prepare 15 mL of solvent. The metal matrixes comprising molecular sieve membrane were impregnated in the solvent for 5 min, dried at room temperature for 3 hrs, and dried in the oven for 10 hrs at 100° C. Then the metal matrixes comprising molecular sieve membrane were roasted in the muffle furnace for 6 hrs. In the furnace, the temperature was heated to 400° C. at a speed of 1° C./min for the 6 hours of roasting, and decreased to the room temperature at a speed of 0.5° C./min to yield a catalyst A comprising SBA-16 membrane on the stainless steel matrixes. Components of the catalyst A by the result of XRF are: 15.09% of Co, 0.46% of Pt, and 3.02% of Ce.

Example 2

1. Pretreatment of Metal Matrixes

A plurality of stainless steel honeycomb matrixes which were cylinders of φ18*30 mm were washed by deionized water and dried in an oven at 100° C. The metal matrixes were treated with 0.2 mol/L of hydrochloric acid for 10 s, washed by deionized water, and dried. Then the matrixes were treated with 1 mol/L of NaOH, washed by deionized water, and dried. After the acid-alkali treatment, the metal matrixes were impregnated in acetone for 0.5 h, washed by deionized water, and dried. Then the metal matrixes were impregnated in hydrogen peroxide for 1 h so as to introduce hydroxyl on the surface of metal matrixes and enhance a durability of the molecular sieve membrane. Finally, the metal matrixes were washed by deionized water, and dried.

2. Implantation of Seed Crystal 6 g of SBA-16 mesoporous molecular sieve was dissolved in 200 mL of absolute ethanol to yield a mixture. The mixture was oscillated for 20 to 30 min using an ultrasonic oscillation method to form a uniformly distributed soak solution of molecular sieve powder. The metal matrixes were impregnated in the soak solution for 1 to 10 s and then taken out. When the soak solution on the metal matrixes stopped flowing and dripping down, the metal matrixes were impregnated again in the soak solution. The soaking process was repeated for a total of 5 times. Then, the metal matrixes were dried in air.

3. Primary In-Situ Growth of Molecular Sieve Membrane 5 g of P123 ($EO_{20}PO_{70}EO_{20}$, M=5800) and 14.99 g of F127 ($EO_{106}PO_{70}EO_{106}$, M=12600) were dissolved in 830 mL of deionized water and stirred at a constant temperature of 35° C. to yield a mixed solution. 142 mL of 37 wt. % of hydrochloric acid was added into the mixed solution and stirred at 35° C.; then 76 mL of TEOS ($Si(OC_2H_5)_4$, M=208.33) was added to the mixed solution and stirred for 1 h to prepare the molecular sieve solution of mesoporous silica SBA-16. The preprocessed metal matrixes were fixed by a Teflon standoff and placed into a Teflon bottle. The molecular sieve solution of mesoporous silica SBA-16 was transferred to the Teflon bottle. The reaction still was sealed and rested for 24 hrs at 35° C. Then the mesoporous silica SBA-16 was crystalized for 24 hrs at 90° C. The reaction still was cooled and the metal matrixes comprising molecular sieve membrane were taken out.

The metal matrixes comprising molecular sieve membrane were washed by deionized water to PH=7, dried for 12 hrs in the oven at 100° C., and cooled in air.

Finally, the metal matrixes comprising molecular sieve membrane were roasted in a muffle furnace. In the furnace, the temperature was heated to 400° C. at a speed of 1° C./min and kept for 1 h; Then the temperature was heated to 550° C. at a speed of 1° C./min and kept for 4 hrs; after that, the temperature was decreased to the room temperature at a speed of 0.5° C./min.

The thickness of the molecular sieve membrane on the surface of the metal matrixes is 31 μm under scanning electron microscopy.

4. Impregnation, Aging and Roasting of Active Component and Additive 14.81 g of $Co(NO_3)_2 \cdot 6H_2O$, 0.16 g of dinitroso diammineplatinum, and 1.86 g of $Ce(NO_3)_3 \cdot 6H_2O$ were dissolved in deionized water to prepare 15 mL of solvent. The metal matrixes comprising molecular sieve membrane were impregnated in the solvent for 5 min, dried at room temperature for 3 hrs, and dried in the oven for 10 hrs at 100° C. Then the metal matrixes comprising molecular sieve membrane were roasted in the muffle furnace for 6 hrs. In the furnace, the temperature was heated to 400° C. at a speed of 1° C./min for the 6 hours of roasting, and decreased to the room temperature at a speed of 0.5° C./min to yield a catalyst B comprising SBA-16 membrane on the stainless steel matrixes. Components of the catalyst B by the result of XRF are: 15.43% of Co, 0.56% of Pt, and 3.10% of Ce.

Example 3

1. Pretreatment of Metal Matrixes

A plurality of stainless steel honeycomb matrixes which were cylinders of φ18*30 mm were washed by deionized water and dried in an oven at 100° C. The metal matrixes were treated with 0.3 mol/L of hydrochloric acid for 10 s, washed by deionized water, and dried. Then the matrixes were treated with 0.5 mol/L of NaOH, washed by deionized water, and dried. After the acid-alkali treatment, the metal matrixes were impregnated in acetone for 1 h, washed by deionized water, and dried. Then the metal matrixes were impregnated in hydrogen peroxide for 2 hrs so as to introduce hydroxyl on the surface of metal matrixes and enhance a durability of the molecular sieve membrane. Finally, the metal matrixes were washed by deionized water, and dried.

2. Implantation of Seed Crystal 5 g of SBA-16 mesoporous molecular sieve was dissolved in 200 mL of absolute ethanol to yield a mixture. The mixture was oscillated for 20 to 30 min using an ultrasonic oscillation method to form a uniformly distributed soak solution of molecular sieve powder. The metal matrixes were impregnated in the soak solution for 1 to 10 s and then taken out. When the soak solution on the metal matrixes stopped flowing and dripping down, the metal matrixes were impregnated again in the soak solution. The soaking process was repeated for a total of 5 times. Then, the metal matrixes were dried in air.

3. Secondary In-Situ Growth of Molecular Sieve Membrane

To increase the thickness of the molecular sieve membrane, in the example, the molecular sieve membrane grew in-situ twice on the surface of the metal matrixes, which means to repeat the in-situ growth of the molecular sieve membrane after the molecular sieve membrane has grown in-situ, been washed by deionized water, dried, and roasted.

5 g of P123 ($EO_{20}PO_{70}EO_{20}$, M=5800) and 10.9 g of F127 ($EO_{106}PO_{70}EO_{106}$, M=12600) were dissolved in 1550 mL of deionized water and stirred at a constant temperature of 35° C. to yield a first mixed solution. 221.5 mL of 37 wt. % of hydrochloric acid was added into the first mixed solution and stirred at 35° C.; then 117 mL of TEOS ($Si(OC_2H_5)_4$, M=208.33) was added to the mixed solution and stirred for 1 h to prepare the molecular sieve solution of mesoporous silica SBA-16. The preprocessed metal matrixes were fixed by a Teflon standoff and placed into a Teflon bottle. The molecular sieve solution of mesoporous silica SBA-16 was transferred to the Teflon bottle. The reaction still was sealed and rested for 24 hrs at 35° C. Then the mesoporous silica SBA-16 was crystalized for 24 hrs at 100° C. The reaction still was cooled and the metal matrixes comprising molecular sieve membrane were taken out.

The metal matrixes comprising molecular sieve membrane were washed by deionized water to PH=7, dried for 12 hrs in the oven at 100° C., and cooled in air.

Finally, the metal matrixes comprising molecular sieve membrane were roasted in a muffle furnace. In the furnace, the temperature was heated to 400° C. at a speed of 1° C./min and kept for 1 h; Then the temperature was heated to 550° C. at a speed of 1° C./min and kept for 4 hrs; after that, the temperature was decreased to the room temperature at a speed of 0.5° C./min.

Again 5 g of P123 ($EO_{20}PO_{70}EO_{20}$, M=5800) and 10.9 g of F127 ($EO_{106}PO_{70}EO_{106}$, M=12600) were dissolved in 1550 mL of deionized water and stirred at a constant temperature of 35° C. to yield a second mixed solution. 223 mL of 37 wt. % of hydrochloric acid was added into the second mixed solution and stirred at 35° C.; then 117 mL of TEOS ($Si(OC_2H_5)_4$, M=208.33) was added to the second mixed solution and stirred for 1 h to prepare the molecular sieve solution of mesoporous silica SBA-16. The metal matrixes comprising molecular sieve membrane were fixed by a Teflon standoff and placed into a Teflon bottle. The molecular sieve solution of mesoporous silica SBA-16 was transferred to the Teflon bottle. The reaction still was sealed and rested for 24 hrs at 35° C. Then the mesoporous silica SBA-16 was crystalized for 24 hrs at 90° C. The reaction still was cooled and the metal matrixes comprising molecular sieve membrane were taken out.

The metal matrixes comprising molecular sieve membrane were washed by deionized water to PH=7, dried for 12 hrs in the oven at 100° C., and cooled in air.

Finally, the metal matrixes comprising molecular sieve membrane were roasted in a muffle furnace. In the furnace, the temperature was heated to 400° C. at a speed of 1° C./min and kept for 1 h; Then the temperature was heated to 550° C. at a speed of 1° C./min and kept for 4 hrs; after that, the temperature was decreased to the room temperature at a speed of 0.5° C./min.

The thickness of the molecular sieve membrane on the surface of the metal matrixes is 43 μm under scanning electron microscopy.

4. Impregnation, Aging and Roasting of Active Component and Additive 14.81 g of $Co(NO_3)_2.6H_2O$, 0.16 g of dinitroso diammineplatinum, and 1.86 g of $Ce(NO_3)_3.6H_2O$ were dissolved in deionized water to prepare 15 mL of solvent. The metal matrixes comprising molecular sieve membrane were impregnated in the solvent for 5 min, dried at room temperature for 3 hrs, and dried in the oven for 10 hrs at 100° C. Then the metal matrixes comprising molecular sieve membrane were roasted in the muffle furnace for 6 hrs. In the furnace, the temperature was heated to 400° C. at a speed of 1° C./min for the 6 hours of roasting, and decreased to the room temperature at a speed of 0.5° C./min to yield a catalyst C comprising SBA-16 membrane on the stainless steel matrixes. Components of the catalyst C by the result of XRF are: 14.97% of Co, 0.49% of Pt, and 3.06% of Ce.

Example 4

1. Pretreatment of Metal Matrixes

A plurality of stainless steel honeycomb matrixes which were cylinders of φ18*30 mm were washed by deionized water and dried in an oven at 100° C. The metal matrixes were treated with 0.1 mol/L of hydrochloric acid for 30 s, washed by deionized water, and dried. Then the matrixes were treated with 1 mol/L of NaOH, washed by deionized water, and dried. After the acid-alkali treatment, the metal matrixes were impregnated in acetone for 0.5 h, washed by deionized water, and dried. Then the metal matrixes were impregnated in hydrogen peroxide for 1 h so as to introduce hydroxyl on the surface of metal matrixes and enhance a durability of the molecular sieve membrane. Finally, the metal matrixes were washed by deionized water, and dried.

2. Implantation of Seed Crystal 4 g of SBA-16 mesoporous molecular sieve was dissolved in 200 mL of absolute ethanol to yield a mixture. The mixture was oscillated for 20 to 30 min using an ultrasonic oscillation method to form a uniformly distributed soak solution of molecular sieve powder. The metal matrixes were impregnated in the soak solution for 1 to 10 s and then taken out. When the soak solution on the metal matrixes stopped flowing and dripping down, the metal matrixes were impregnated again in the soak solution. The soaking process was repeated for a total of 10 times. Then, the metal matrixes were dried in air.

3. Secondary In-Situ Growth of Molecular Sieve Membrane

To increase the thickness of the molecular sieve membrane, in the example, the molecular sieve membrane grew in-situ twice on the surface of the metal matrixes, which means to repeat the in-situ growth of the molecular sieve membrane after the molecular sieve membrane has grown in-situ, been washed by deionized water, dried, and roasted.

5 g of P123 ($EO_{20}PO_{70}EO_{20}$, M=5800) and 25.10 g of F127 ($EO_{106}PO_{70}EO_{106}$, M=12600) were dissolved in 1400 mL of deionized water and stirred at a constant temperature of 35° C. to yield a first mixed solution. 202.9 mL of 37 wt. % of hydrochloric acid was added into the first mixed solution and stirred at 35° C.; then 113 mL of TEOS ($Si(OC_2H_5)_4$, M=208.33) was added to the mixed solution and stirred for 1 h to prepare the molecular sieve solution of mesoporous silica SBA-16. The preprocessed metal matrixes were fixed by a Teflon standoff and placed into a Teflon bottle. The molecular sieve solution of mesoporous silica SBA-16 was transferred to the Teflon bottle. The reaction still was sealed and rested for 24 hrs at 35° C. Then the mesoporous silica SBA-16 was crystalized for 24 hrs at 75° C. The reaction still was cooled and the metal matrixes comprising molecular sieve membrane were taken out.

The metal matrixes comprising molecular sieve membrane were washed by deionized water to PH=7, dried for 12 hrs in the oven at 100° C., and cooled in air.

Finally, the metal matrixes comprising molecular sieve membrane were roasted in a muffle furnace. In the furnace, the temperature was heated to 400° C. at a speed of 1° C./min and kept for 1 h; Then the temperature was heated to 550° C. at a speed of 1° C./min and kept for 4 hrs; after that, the temperature was decreased to the room temperature at a speed of 0.5° C./min.

Again 5 g of P123 ($EO_{20}PO_{70}EO_{20}$, M=5800) and 25.10 g of F127 ($EO_{106}PO_{70}EO_{106}$, M=12600) were dissolved in 1400 mL of deionized water and stirred at a constant temperature of 35° C. to yield a second mixed solution. 202.9 mL of 37 wt. % of hydrochloric acid was added into the second mixed solution and stirred at 35° C.; then 113 mL of TEOS ($Si(OC_2H_5)_4$, M=208.33) was added to the second mixed solution and stirred for 1 h to prepare the molecular sieve solution of mesoporous silica SBA-16. The metal matrixes comprising molecular sieve membrane were fixed by a Teflon standoff and placed into a Teflon bottle. The molecular sieve solution of mesoporous silica SBA-16 was transferred to the Teflon bottle. The reaction still was sealed and rested for 24 hrs at 35° C. Then the mesoporous silica SBA-16 was crystalized for 24 hrs at 75° C. The reaction still was cooled and the metal matrixes comprising molecular sieve membrane were taken out.

The metal matrixes comprising molecular sieve membrane were washed by deionized water to PH=7, dried for 12 hrs in the oven at 100° C., and cooled in air.

Finally, the metal matrixes comprising molecular sieve membrane were roasted in a muffle furnace. In the furnace, the temperature was heated to 400° C. at a speed of 1° C./min and kept for 1 h; Then the temperature was heated to 550° C. at a speed of 1° C./min and kept for 4 hrs; after that, the temperature was decreased to the room temperature at a speed of 0.5° C./min.

The thickness of the molecular sieve membrane on the surface of the metal matrixes is 46 μm under scanning electron microscopy.

4. Impregnation, Aging and Roasting of Active Component and Additive 14.81 g of $Co(NO_3)_2.6H_2O$, 0.16 g of dinitroso diammineplatinum, and 1.86 g of $Ce(NO_3)_3.6H_2O$ were dissolved in deionized water to prepare 15 mL of solvent. The metal matrixes comprising molecular sieve membrane were impregnated in the solvent for 5 min, dried at room temperature for 3 hrs, and dried in the oven for 10 hrs at 100° C. Then the metal matrixes comprising molecular sieve membrane were roasted in the muffle furnace for 6 hrs. In the furnace, the temperature was heated to 400° C. at a speed of 1° C./min for the 6 hours of roasting, and decreased to the room temperature at a speed of 0.5° C./min to yield a catalyst D comprising SBA-16 membrane on the stainless steel matrixes. Components of the catalyst D by the result of XRF are: 15.22% of Co, 0.59% of Pt, and 2.95% of Ce.

Example 5

1. Pretreatment of Metal Matrixes

A plurality of stainless steel honeycomb matrixes which were cylinders of φ18*30 mm were washed by deionized water and dried in an oven at 100° C. The metal matrixes were treated with 0.1 mol/L of hydrochloric acid for 15 s, washed by deionized water, and dried. Then the matrixes were treated with 1 mol/L of NaOH, washed by deionized water, and dried. After the acid-alkali treatment, the metal matrixes were impregnated in acetone for 0.5 h, washed by deionized water, and dried. Then the metal matrixes were impregnated in hydrogen peroxide for 0.5 h so as to introduce hydroxyl on the surface of metal matrixes and enhance a durability of the molecular sieve membrane. Finally, the metal matrixes were washed by deionized water, and dried.

2. Implantation of Seed Crystal 3 g of SBA-16 mesoporous molecular sieve was dissolved in 200 mL of absolute ethanol to yield a mixture. The mixture was oscillated for 20 to 30 min using an ultrasonic oscillation method to form a uniformly distributed soak solution of molecular sieve powder. The metal matrixes were impregnated in the soak solution for 1 to 10 s and then taken out. When the soak solution on the metal matrixes stopped flowing and dripping down, the metal matrixes were impregnated again in the soak solution. The soaking process was repeated for a total of 15 times. Then, the metal matrixes were dried in air.

3. Secondary In-Situ Growth of Molecular Sieve Membrane

To increase the thickness of the molecular sieve membrane, in the example, the molecular sieve membrane grew in-situ three times on the surface of the metal matrixes, which means to repeat twice the in-situ growth of the molecular sieve membrane after the molecular sieve membrane has grown in-situ, been washed by deionized water, dried, and roasted.

5 g of P123 ($EO_{20}PO_{70}EO_{20}$, M=5800) and 32.6 g of F127 ($EO_{106}PO_{70}EO_{106}$, M=12600) were dissolved in 790 mL of deionized water and stirred at a constant temperature of 35° C. to yield a first mixed solution. 125.3 mL of 37 wt. % of hydrochloric acid was added into the first mixed solution and stirred at 35° C.; then 90 mL of TEOS ($Si(OC_2H_5)_4$, M=208.33) was added to the mixed solution and stirred for 1 h to prepare the molecular sieve solution of mesoporous silica SBA-16. The preprocessed metal matrixes were fixed by a Teflon standoff and placed into a Teflon bottle. The molecular sieve solution of mesoporous silica SBA-16 was transferred to the Teflon bottle. The reaction still was sealed and rested for 24 hrs at 35° C. Then the mesoporous silica SBA-16 was crystalized for 24 hrs at 85° C. The reaction still was cooled and the metal matrixes comprising molecular sieve membrane were taken out.

The metal matrixes comprising molecular sieve membrane were washed by deionized water to PH=7, dried for 12 hrs in the oven at 100° C., and cooled in air.

Finally, the metal matrixes comprising molecular sieve membrane were roasted in a muffle furnace. In the furnace, the temperature was heated to 400° C. at a speed of 1° C./min and kept for 1 h; Then the temperature was heated to 550° C. at a speed of 1° C./min and kept for 4 hrs; after that, the temperature was decreased to the room temperature at a speed of 0.5° C./min.

Again 5 g of P123 ($EO_{20}PO_{70}EO_{20}$, M=5800) and 32.6 g of F127 ($EO_{106}PO_{70}EO_{106}$, M=12600) were dissolved in 790 mL of deionized water and stirred at a constant temperature of 35° C. to yield a second mixed solution. 125.3 mL of 37 wt. % of hydrochloric acid was added into the second mixed solution and stirred at 35° C.; then 90 mL of TEOS ($Si(OC_2H_5)_4$, M=208.33) was added to the second mixed solution and stirred for 1 h to prepare the molecular sieve solution of mesoporous silica SBA-16. The metal matrixes comprising molecular sieve membrane were fixed by a Teflon standoff and placed into a Teflon bottle. The molecular sieve solution of mesoporous silica SBA-16 was transferred to the Teflon bottle. The reaction still was sealed and rested for 24 hrs at 35° C. Then the mesoporous silica SBA-16 was crystalized for 24 hrs at 85° C. The reaction still was cooled and the metal matrixes comprising molecular sieve membrane were taken out.

The metal matrixes comprising molecular sieve membrane were washed by deionized water to PH=7, dried for 12 hrs in the oven at 100° C., and cooled in air.

Finally, the metal matrixes comprising molecular sieve membrane were roasted in a muffle furnace. In the furnace, the temperature was heated to 400° C. at a speed of 1° C./min and kept for 1 h; Then the temperature was heated to 550° C. at a speed of 1° C./min and kept for 4 hrs; after that, the temperature was decreased to the room temperature at a speed of 0.5° C./min.

Once again, 5 g of P123 ($EO_{20}PO_{70}EO_{20}$, M=5800) and 32.6 g of F127 ($EO_{106}PO_{70}EO_{106}$, M=12600) were dissolved in 790 mL of deionized water and stirred at a constant temperature of 35° C. to yield a third mixed solution. 125.3 mL of 37 wt. % of hydrochloric acid was added into the third mixed solution and stirred at 35° C.; then 90 mL of TEOS ($Si(OC_2H_5)_4$, M=208.33) was added to the second mixed solution and stirred for 1 h to prepare the molecular sieve solution of mesoporous silica SBA-16. The metal matrixes comprising molecular sieve membrane were fixed by a Teflon standoff and placed into a Teflon bottle. The molecular sieve solution of mesoporous silica SBA-16 was transferred to the Teflon bottle. The reaction still was sealed and rested for 24 hrs at 35° C. Then the mesoporous silica SBA-16 was crystalized for 24 hrs at 85° C. The reaction still was cooled and the metal matrixes comprising molecular sieve membrane were taken out.

The metal matrixes comprising molecular sieve membrane were washed by deionized water to PH=7, dried for 12 h in the oven at 100° C., and cooled in air.

Finally, the metal matrixes comprising molecular sieve membrane were roasted in a muffle furnace. In the furnace, the temperature was heated to 400° C. at a speed of 1° C./min and kept for 1 h; Then the temperature was heated to 550° C. at a speed of 1° C./min and kept for 4 hrs; after that, the temperature was decreased to the room temperature at a speed of 0.5° C./min.

The thickness of the molecular sieve membrane on the surface of the metal matrixes is 73 μm under scanning electron microscopy.

4. Impregnation, Aging and Roasting of Active Component and Additive 14.81 g of $Co(NO_3)_2 \cdot 6H_2O$, 0.16 g of dinitroso diammineplatinum, and 1.86 g of $Ce(NO_3)_3 \cdot 6H_2O$ were dissolved in deionized water to prepare 15 mL of solvent. The metal matrixes comprising molecular sieve membrane were impregnated in the solvent for 5 min, dried at room temperature for 3 hrs, and dried in the oven for 10 hrs at 100° C. Then the metal matrixes comprising molecular sieve membrane were roasted in the muffle furnace for 6 hrs. In the furnace, the temperature was heated to 400° C. at a speed of 1° C./min for the 6 hours of roasting, and decreased to the room temperature at a speed of 0.5° C./min to yield a catalyst E comprising SBA-16 membrane on the stainless steel matrixes. Components of the catalyst E by the result of XRF are: 15.22% of Co, 0.59% of Pt, and 2.95% of Ce.

Example 6

1. Pretreatment of Metal Matrixes

A plurality of stainless steel honeycomb matrixes which were cylinders of φ18*30 mm were washed by deionized water and dried in an oven at 100° C. The metal matrixes were treated with 0.1 mol/L of hydrochloric acid for 10 s, washed by deionized water, and dried. Then the matrixes were treated with 1 mol/L of NaOH, washed by deionized water, and dried. After the acid-alkali treatment, the metal matrixes were impregnated in acetone for 1 h, washed by deionized water, and dried. Then the metal matrixes were impregnated in hydrogen peroxide for 1.5 hrs so as to introduce hydroxyl on the surface of metal matrixes and enhance a durability of the molecular sieve membrane. Finally, the metal matrixes were washed by deionized water, and dried.

2. Implantation of Seed Crystal 8 g of SBA-16 mesoporous molecular sieve was dissolved in 200 mL of absolute ethanol to yield a mixture. The mixture was oscillated for 20 to 30 min using an ultrasonic oscillation method to form a uniformly distributed soak solution of molecular sieve powder. The metal matrixes were impregnated in the soak solution for 1 to 10 s and then taken out. When the soak solution on the metal matrixes stopped flowing and dripping down, the metal matrixes were impregnated again in the soak solution. The soaking process was repeated for a total of 3 times. Then, the metal matrixes were dried in air.

3. Secondary In-Situ Growth of Molecular Sieve Membrane

To increase the thickness of the molecular sieve membrane, in the example, the molecular sieve membrane grew in-situ three times on the surface of the metal matrixes, which means to repeat twice the in-situ growth of the molecular sieve membrane after the molecular sieve membrane has grown in-situ, been washed by deionized water, dried, and roasted.

5 g of P123 ($EO_{20}PO_{70}EO_{20}$, M=5800) and 16.3 g of F127 ($EO_{106}PO_{70}EO_{106}$, M=12600) were dissolved in 1089 mL of deionized water and stirred at a constant temperature of 35° C. to yield a first mixed solution. 132 mL of 37 wt. % of hydrochloric acid was added into the first mixed solution and stirred at 35° C.; then 72 mL of TEOS ($Si(OC_2H_5)_4$, M=208.33) was added to the mixed solution and stirred for 1 h to prepare the molecular sieve solution of mesoporous silica SBA-16. The preprocessed metal matrixes were fixed by a Teflon standoff and placed into a Teflon bottle. The molecular sieve solution of mesoporous silica SBA-16 was transferred to the Teflon bottle. The reaction still was sealed and rested for 24 hrs at 35° C. Then the mesoporous silica SBA-16 was crystalized for 24 hrs at 80° C. The reaction still was cooled and the metal matrixes comprising molecular sieve membrane were taken out.

The metal matrixes comprising molecular sieve membrane were washed by deionized water to PH=7, dried for 12 hrs in the oven at 100° C., and cooled in air.

Finally, the metal matrixes comprising molecular sieve membrane were roasted in a muffle furnace. In the furnace, the temperature was heated to 400° C. at a speed of 1° C./min and kept for 1 h; Then the temperature was heated to 550° C. at a speed of 1° C./min and kept for 4 hrs; after that, the temperature was decreased to the room temperature at a speed of 0.5° C./min.

Again 5 g of P123 ($EO_{20}PO_{70}EO_{20}$, M=5800) and 16.3 g of F127 ($EO_{106}PO_{70}EO_{106}$, M=12600) were dissolved in 1089 mL of deionized water and stirred at a constant temperature of 35° C. to yield a second mixed solution. 132 mL of 37 wt. % of hydrochloric acid was added into the second mixed solution and stirred at 35° C.; then 72 mL of TEOS ($Si(OC_2H_5)_4$, M=208.33) was added to the mixed solution and stirred for 1 h to prepare the molecular sieve solution of mesoporous silica SBA-16. The metal matrixes comprising molecular sieve membrane were fixed by a Teflon standoff and placed into a Teflon bottle. The molecular sieve solution of mesoporous silica SBA-16 was transferred to the Teflon bottle. The reaction still was sealed and rested for 24 hrs at 35° C. Then the mesoporous silica SBA-16 was crystalized for 24 hrs at 80° C. The reaction still was cooled and the metal matrixes comprising molecular sieve membrane were taken out.

The metal matrixes comprising molecular sieve membrane were washed by deionized water to PH=7, dried for 12 hrs in the oven at 100° C., and cooled in air.

Finally, the metal matrixes comprising molecular sieve membrane were roasted in a muffle furnace. In the furnace, the temperature was heated to 400° C. at a speed of 1° C./min and kept for 1 h Then the temperature was heated to 550° C. at a speed of 1° C./min and kept for 4 hrs; after that, the temperature was decreased to the room temperature at a speed of 0.5° C./min.

Once again, 5 g of P123 ($EO_{20}PO_{70}EO_{20}$, M=5800) and 16.3 g of F127 ($EO_{106}PO_{70}EO_{106}$, M=12600) were dissolved in 1089 mL of deionized water and stirred at a constant temperature of 35° C. to yield a third mixed solution. 132 mL of 37 wt. % of hydrochloric acid was added into the third mixed solution and stirred at 35° C.; then 72 mL of TEOS ($Si(OC_2H_5)_4$, M=208.33) was added to the mixed solution and stirred for 1 h to prepare the molecular sieve solution of mesoporous silica SBA-16. The metal matrixes comprising molecular sieve membrane were fixed by a Teflon standoff and placed into a Teflon bottle. The molecular sieve solution of mesoporous silica SBA-16 was transferred to the Teflon bottle. The reaction still was sealed and rested for 24 hrs at 35° C. Then the mesoporous silica SBA-16 was crystalized for 24 hrs at 80° C. The reaction still was cooled and the metal matrixes comprising molecular sieve membrane were taken out.

The metal matrixes comprising molecular sieve membrane were washed by deionized water to PH=7, dried for 12 hrs in the oven at 100° C., and cooled in air.

Finally, the metal matrixes comprising molecular sieve membrane were roasted in a muffle furnace. In the furnace, the temperature was heated to 400° C. at a speed of 1° C./min and kept for 1 h; Then the temperature was heated to 550° C. at a speed of 1° C./min and kept for 4 hrs; after that, the temperature was decreased to the room temperature at a speed of 0.5° C./min.

The thickness of the molecular sieve membrane on the surface of the metal matrixes is 60 μm under scanning electron microscopy.

4. Impregnation, Aging and Roasting of Active Component and Additive 14.81 g of $Co(NO_3)_2 \cdot 6H_2O$, 0.16 g of dinitroso diammineplatinum, and 1.86 g of $Ce(NO_3)_3 \cdot 6H_2O$ were dissolved in deionized water to prepare 15 mL of solvent. The metal matrixes comprising molecular sieve membrane were impregnated in the solvent for 5 min, dried at room temperature for 3 hrs, and dried in the oven for 10 hrs at 100° C. Then the metal matrixes comprising molecular sieve membrane were roasted in the muffle furnace for 6 hrs. In the furnace, the temperature was heated to 400° C. at a speed of 1° C./min for the 6 hours of roasting, and decreased to the room temperature at a speed of 0.5° C./min to yield a catalyst F comprising SBA-16 membrane on the stainless steel matrixes. Components of the catalyst F by the result of XRF are: 15.31% of Co, 0.46% of Pt, and 3.03% of Ce.

Example 7

1. Pretreatment of Metal Matrixes

A plurality of stainless steel honeycomb matrixes which were cylinders of φ18*30 mm were washed by deionized water and dried in an oven at 100° C. The metal matrixes were treated with 0.1 mol/L of hydrochloric acid for 10 s, washed by deionized water, and dried. Then the matrixes were treated with 1 mol/L of NaOH, washed by deionized water, and dried. After the acid-alkali treatment, the metal matrixes were impregnated in acetone for 1 h, washed by deionized water, and dried. Then the metal matrixes were impregnated in hydrogen peroxide for 2 hrs so as to introduce hydroxyl on the surface of metal matrixes and enhance a durability of the molecular sieve membrane. Finally, the metal matrixes were washed by deionized water, and dried.

2. Implantation of Seed Crystal 10 g of SBA-16 mesoporous molecular sieve was dissolved in 200 mL of absolute ethanol to yield a mixture. The mixture was oscillated for 20 to 30 min using an ultrasonic oscillation method to form a uniformly distributed soak solution of molecular sieve powder. The metal matrixes were impregnated in the soak solution for 1 to 10 s and then taken out. When the soak solution on the metal matrixes stopped flowing and dripping down, the metal matrixes were impregnated again in the soak solution. Then, the metal matrixes were dried in air.

3. Primary In-Situ Growth of Molecular Sieve Membrane 5 g of P123 ($EO_{20}PO_{70}EO_{20}$, M=5800) and 32.6 g of F127 ($EO_{106}PO_{70}EO_{106}$, M=12600) were dissolved in 1300 mL of deionized water and stirred at a constant temperature of 35° C. to yield a mixed solution. 161 mL of 37 wt. % of hydrochloric acid was added into the mixed solution and stirred at 35° C.; then 63 mL of TEOS ($Si(OC_2H_5)_4$, M=208.33) was added to the mixed solution and stirred for 1 h to prepare the molecular sieve solution of mesoporous silica SBA-16. The preprocessed metal matrixes were fixed by a Teflon standoff and placed into a Teflon bottle. The molecular sieve solution of mesoporous silica SBA-16 was transferred to the Teflon bottle. The reaction still was sealed and rested for 24 hrs at 35° C. Then the mesoporous silica SBA-16 was crystalized for 24 hrs at 105° C. The reaction still was cooled and the metal matrixes comprising molecular sieve membrane were taken out.

The metal matrixes comprising molecular sieve membrane were washed by deionized water to PH=7, dried for 12 h in the oven at 100° C., and cooled in air.

Finally, the metal matrixes comprising molecular sieve membrane were roasted in a muffle furnace. In the furnace, the temperature was heated to 400° C. at a speed of 1° C./min and kept for 1 h; Then the temperature was heated to 550° C. at a speed of 1° C./min and kept for 4 hrs; after that, the temperature was decreased to the room temperature at a speed of 0.5° C./min.

The thickness of the molecular sieve membrane on the surface of the metal matrixes is 39 μm under scanning electron microscopy.

4. Impregnation, Aging and Roasting of Active Component and Additive 14.81 g of $Co(NO_3)_2 \cdot 6H_2O$, 0.16 g of dinitroso diammineplatinum, and 1.86 g of $Ce(NO_3)_3 \cdot 6H_2O$ were dissolved in deionized water to prepare 15 mL of solvent. The metal matrixes comprising molecular sieve membrane were impregnated in the solvent for 5 min, dried at room temperature for 3 hrs, and dried in the oven for 10 hrs at 100° C. Then the metal matrixes comprising molecular sieve membrane were roasted in the muffle furnace for 6 hrs. In the furnace, the temperature was heated to 400° C. at a speed of 1° C./min for the 6 hours of roasting, and decreased to the room temperature at a speed of 0.5° C./min to yield a catalyst G comprising SBA-16 membrane on the stainless steel matrixes. Components of the catalyst G by the result of XRF are: 14.89% of Co, 0.52% of Pt, and 3.09% of Ce.

Comparison Example 1

10 g of P123 ($EO_{20}PO_{70}EO_{20}$, M=5800) and 23.6 g of F127 ($EO_{106}PO_{70}EO_{106}$, M=12600) were dissolved in 2800 mL of deionized water and stirred at a constant temperature of 35° C. to yield a mixed solution. 400 mL of 37 wt. % of hydrochloric acid was added into the mixed solution and stirred at 35° C.; then 130 mL of TEOS ($Si(OC_2H_5)_4$, M=208.33) was added to the mixed solution and stirred for 1 h to prepare the molecular sieve solution of mesoporous silica SBA-16. The molecular sieve solution of mesoporous silica SBA-16 was transferred to a stainless steel reaction still with polytetrafluoroethylene substrate (Teflon bottle). The reaction still was sealed and rested for 24 hrs at 35° C. Then the mesoporous silica SBA-16 was crystallized for 24 hrs at 100° C. The reaction still was cooled, filtrated, and washed to PH=7. The mesoporous silica SBA-16 was dried at 120° C. for 5 hrs, and was roasted at 550° C. for 5 hrs to yield white powder of mesoporous silica SBA-16 featuring cage microstructure and having a pore diameter between 6 and 20 nm.

26.66 g of $Co(NO_3)_2 \cdot 6H_2O$, 0.27 g of dinitroso diammineplatinum, and 3.35 g of $Ce(NO_3)_3 \cdot 6H_2O$ were dissolved in deionized water to prepare 28 mL of solvent. 29.3 g of the mesoporous silica SBA-16 was used as the carrier, impregnated in the solvent, dried at room temperature for 3 hrs, and dried in the oven for 10 hrs at 100° C. Then the molecular sieve was roasted in the muffle furnace for 6 hrs. In the furnace, the temperature was heated to 400° C. at a speed of 1° C./min for the 6 hours of roasting, and decreased to the room temperature naturally to yield an SBA-16 powder catalyst H. Components of the catalyst H by the result of XRF are: 15.24% of Co, 0.55% of Pt, and 2.98% of Ce. The powder catalyst was compressed to be tablets and sieved to select particles having particle sizes of between 30 and 60 meshes to perform subsequent experiments of catalyst activity evaluation.

Comparison Example 2

10 g of P123 ($EO_{20}PO_{70}EO_{20}$, M=5800) and 65 g of F127 ($EO_{106}PO_{70}EO_{106}$, M=12600) were dissolved in 2600 mL of deionized water and stirred at a constant temperature of 35° C. to yield a mixed solution. 320 mL of 37 wt. % of hydrochloric acid was added into the mixed solution and stirred at 35° C.; then 125 mL of TEOS ($Si(OC_2H_5)_4$, M=208.33) was added to the mixed solution and stirred for 1 h to prepare the molecular sieve solution of mesoporous silica SBA-16. The molecular sieve solution of mesoporous silica SBA-16 was transferred to a stainless steel reaction still with polytetrafluoroethylene substrate (Teflon bottle). The reaction still was sealed and rested for 24 hrs at 35° C. Then the mesoporous silica SBA-16 was crystalized for 24 hrs at 95° C. The reaction still was cooled, filtrated, and washed to PH=7. The mesoporous silica SBA-16 was dried at 120° C. for 5 hrs, and was roasted at 550° C. for 5 hrs to yield white powder of mesoporous silica SBA-16 featuring cage microstructure and having a pore diameter between 6 and 20 nm.

26.66 g of $Co(NO_3)_2 \cdot 6H_2O$, 0.27 g of dinitroso diammineplatinum, and 3.35 g of $Ce(NO_3)_3 \cdot 6H_2O$ were dissolved in deionized water to prepare 28 mL of solvent. 29.3 g of the mesoporous silica SBA-16 was used as the carrier, impregnated in the solvent, dried at room temperature for 3 hrs, and dried in the oven for 10 hrs at 100° C. Then the molecular sieve was roasted in the muffle furnace for 6 hrs. In the furnace, the temperature was heated to 400° C. at a speed of 1° C./min for the 6 hours of roasting, and decreased to the room temperature naturally to yield an SBA-16 powder catalyst I. Components of the catalyst I by the result of XRF are: 15.16% of Co, 0.47% of Pt, and 3.12% of Ce. The powder catalyst was compressed to be tablets and sieved to select particles having particle sizes of between 30 and 60 meshes to perform subsequent experiments of catalyst activity evaluation.

Molar Ratios of components in the molecular sieve solution of mesoporous silica SBA-16s of the examples are shown in Table 1:

TABLE 1

| Molar ratios | P123 | F127 | TEOS | HCl | $H_2O$ |
|---|---|---|---|---|---|
| Example 1 | 1 | 1.09 | 335 | 2750 | 90000 |
| Example 2 | 1 | 1.38 | 423 | 1926 | 53972 |
| Example 3 | 1 | 1 | 650 | 3000 | 100000 |
| Example 4 | 1 | 2.31 | 625 | 2750 | 90000 |
| Example 5 | 1 | 3 | 500 | 1700 | 51000 |
| Example 6 | 1 | 1.5 | 400 | 1800 | 70000 |
| Example 7 | 1 | 3 | 350 | 2200 | 84000 |
| Comparison Example 1 | 1 | 1.09 | 335 | 2750 | 90000 |
| Comparison Example 2 | 1 | 3 | 350 | 2200 | 84000 |

Evaluation and Contrast of Catalyst Activation and Catalytic Activity

No more than three pieces of monolithic catalyst were taken. A difference method is employed to determine the catalyst mass: the mass of the monolithic catalyst comprising molecular sieve membrane after soaking in the salt solution and roasting minus the mass of the preprocessed metal matrixes. And more than 3 g of catalyst G was added into a φ18 mm fixed bed reactor to be evaluated. Under the pressure of 0.5 MPa and under hydrogen atmosphere with GHSV=3SL/(g·h), the reactor was heated from the room temperature at a speed of 1° C./min; when the temperature reached 200° C., 250° C., 300° C., 350° C., the temperature was kept for 30 min, then continued to rise. Finally, the catalyst was activated in-situ at 400° C. for 10 hrs. Then the reactor was cooled to the room temperature at a speed of 0.5° C./min.

Gases used by the activity evaluation experiment were mixed gases of nitrogen and synthesis gas ($V_{N2}:Vsyn_{gas}$=1:1), and a molar composition of the synthesis gas is $H_2/CO$=2. The reaction is performed under a pressure of 2.0 MPa at 210° C., and GHSV=6 SL/(g·h). Components are measured by XRF, and the result of the catalyst activity evaluation was shown in Table 2:

TABLE 2

Evaluation of catalysts in Fischer-Tropsch synthesis reaction

| Catalyst | SBA-16 catalyst components | Thickness of carrier | CO conversion rate | $CH_4$ selectivity | $C_5^+$ selectivity |
|---|---|---|---|---|---|
| A | 15.09% Co/0.46% Pt/3.02% Ce | 26 μm | 41.6% | 6.4% | 81.3% |
| B | 15.43% Co/0.56% Pt/3.10% Ce | 30 μm | 42.8% | 6.1% | 82.9% |
| C | 14.97% Co/0.49% Pt/3.06% Ce | 43 μm | 47.5% | 5.8% | 85.9% |
| D | 15.22% Co/0.59% Pt/2.95% Ce | 46 μm | 49.1% | 5.7% | 86.5% |
| E | 15.02% Co/0.44% Pt/3.05% Ce | 73 μm | 44.0% | 6.8% | 83.8% |
| F | 15.31% Co/0.46% Pt/3.03% Ce | 60 μm | 47.9% | 5.9% | 86.1% |
| G | 14.89% Co/0.52% Pt/3.09% Ce | 39 μm | 45.7% | 6.0% | 85.5% |
| H | 15.24% Co/0.55% Pt/2.98% Ce | / | 38.3% | 8.4% | 80.4% |
| I | 15.16% Co/0.47% Pt/3.12% Ce | / | 37.7% | 8.6% | 80.0% |

The result shows that monolithic catalyst comprising molecular sieve membrane, especially when the thickness of the molecular sieve membrane is between 30 and 60 μm, has a relatively high CO conversion rate, high $C_5^+$ selectivity, and low selectivity of the byproduct $CH_4$. Compared with powder Co/SBA-16 catalyst, the monolithic catalyst comprising molecular sieve membrane displays stronger catalytic activity.

During the experiment, the temperature control of the monolithic catalyst comprising molecular sieve membrane is stable and the temperature fluctuates within ±1.5° C., while the temperatures of the catalyst H and I change between 206 and 217.7 during the experiment. Therefore, the monolithic catalyst features better heat transfer property.

To sum up, because of the special structure that the molecular sieve membrane grows in-situ on the surface of the metal matrixes, the monolithic catalyst eliminates diffusion limitation in a pore channel of the catalyst, improves the mass transfer effect, and increases the catalyst activity and selectivity of product.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A method for preparing a monolithic catalyst comprising:
cobalt;
a matrix, the matrix comprising at least one metal selected from the group consisting of silver, gold, copper, platinum, titanium, molybdenum, iron, and tin;
an additive, the additive being lanthanum, zirconium, cerium, rhodium, platinum, rhenium, ruthenium, titanium, magnesium, calcium, strontium, or a mixture thereof; and
a molecular sieve membrane, the molecular sieve membrane being mesoporous silica SBA-16 which is disposed on a surface of the metal matrix and is a carrier of the cobalt and the additive;
wherein
a thickness of the carrier of the molecular sieve membrane is between 26 and 67 μm, the method comprising:
1) washing a plurality of metal matrixes having a honeycomb-shape and uniform sizes using deionized water; and drying the metal matrixes in an oven at 100° C.;
2) dissolving molecular sieve powders of the mesoporous silica SBA-16 in absolute ethanol to yield a mixture; oscillating the mixture for 20 to 30 min using an ultrasonic oscillation method to form a uniformly distributed soak solution of the molecular sieve powders; soaking the metal matrixes pretreated in 1) in the soak solution for 1 to 10 s; taking the metal matrixes out, and when the soak solution on the metal matrixes stops flowing and dripping down, soaking the metal matrixes in the soak solution again; repeating the impregnation of the metal matrixes, and then drying the metal matrixes in air;
3) placing the metal matrixes obtained in 2) in a molecular sieve solution of mesoporous silica SBA-16 and crystallizing the mesoporous silica SBA-16 for 5 to 120 hrs at a temperature of between 70 and 150° C. in a reaction still; allowing the mesoporous silica SBA-16 to grow in-situ on a surface of the metal matrixes to yield metal matrixes comprising a molecular sieve membrane; taking out the metal matrixes comprising the molecular sieve membrane, washing the metal matrixes comprising the molecular sieve membrane using deionized water, and drying; and roasting the metal matrixes comprising the molecular sieve membrane for 4 to 8 hrs at a temperature of between 400 and 600° C.; and
4) soaking the metal matrixes comprising the molecular sieve membrane obtained in 3) in a solution of a cobalt salt and the additive for 1 to 20 min; drying the metal matrixes comprising the molecular sieve membrane and aging at room temperature for 3 to 36 hrs; roasting the metal matrixes comprising the molecular sieve membrane for 6 to 12 hrs at a programmed temperature of between 300 and 550° C., and then gradually cooling the metal matrixes comprising the molecular sieve membrane to room temperature.

2. The method of claim 1, wherein after the metal matrixes are dried in the oven at 100° C. in 1), the metal matrixes are treated with 0.1 mol/L of hydrochloric acid for 5 to 60 s, washed by deionized water, and dried; then the metal matrixes are treated with 1 mol/L of NaOH, washed by deionized water, and dried; following acid-alkali treatment, the metal matrixes are impregnated in acetone for 0.5 to 1 h, washed by deionized water, and dried; then the metal matrixes are impregnated in hydrogen peroxide for 0.5 to 1 h so as to introduce hydroxyl on the surface of metal matrixes and enhance a durability of the molecular sieve membrane; and then the metal matrixes are washed by deionized water, and dried.

3. The method of claim 1, wherein an soaking process in 2) is repeated for between 1 and 20 time(s).

4. The method of claim 2, wherein an soaking process in 2) is repeated for between 1 and 20 time(s).

5. The method of claim 1, wherein a method for preparing the molecular sieve solution of mesoporous silica SBA-16 in 3) comprises: dissolving P123 ($EO_{20}PO_{70}EO_{20}$) and F127 ($EO_{106}PO_{70}EO_{106}$) in deionized water and stirring to yield a mixed solution; adding hydrochloric acid to the mixed solution and stirring at 35±5° C.; then adding TEOS (Si$(OC_2H_5)_4$) to the mixed solution and stirring for 1 to 1.2 h; a molar ratio of materials in the molecular sieve solution of mesoporous silica SBA-16 is P123:F127:TEOS:HCl:$H_2O$=1:(1-5):(200-800):(1200-3500):(30000-120000).

6. The method of claim 2, wherein a method for preparing the molecular sieve solution of mesoporous silica SBA-16 in 3) comprises: dissolving P123 ($EO_{20}PO_{70}EO_{20}$) and F127 ($EO_{106}PO_{70}EO_{106}$) in deionized water and stirring to yield a mixed solution; adding hydrochloric acid to the mixed solution and stirring at 35±5° C.; then adding TEOS (Si$(OC_2H_5)_4$) to the mixed solution and stirring for 1 to 1.2 h; a molar ratio of materials in the molecular sieve solution of mesoporous silica SBA-16 is P123:F127:TEOS:HCl:$H_2O$=1:(1-5):(200-800):(1200-3500):(30000-120000).

7. The method of claim 1, wherein in 3), by adjusting components of the molecular sieve solution or repeating times of the in-situ growth of the mesoporous silica SBA-16, the thickness of the molecular sieve membrane is controlled to be between 26 and 67 μm.

8. The method of claim 2, wherein in 3), by adjusting components of the molecular sieve solution or repeating times of the in-situ growth of the mesoporous silica SBA-16, the thickness of the molecular sieve membrane is controlled to be between 26 and 67 μm.

9. The method of claim 1, wherein a method for preparing the molecular sieve solution of mesoporous silica SBA-16 in 3) comprises: dissolving P123 and F127 in deionized water and stirring to yield a mixed solution; adding hydrochloric acid into the mixed solution and stirring at 35±5° C.; then adding TEOS to the mixed solution and stirring for 1 to 1.2 h; a molar ratio of materials in the molecular sieve solution of mesoporous silica SBA-16 is P123:F127:TEOS:HCl:$H_2O$=1:(1-3):(350-650):(1700-3000):(50000-100000).

10. The method of claim 2, wherein a method for preparing the molecular sieve solution of mesoporous silica SBA-16 in 3) comprises: dissolving P123 and F127 in deionized water and stirring to yield a mixed solution; adding hydrochloric acid into the mixed solution and stirring at 35±5° C.; then adding TEOS to the mixed solution and stirring for 1 to 1.2 h; a molar ratio of materials in the molecular sieve solution of mesoporous silica SBA-16 is P123:F127:TEOS:HCl:$H_2O$=1:(1-3):(350-650):(1700-3000):(50000-100000).

11. The method of claim 1, wherein by adjusting components of the molecular sieve solution or repeating times of the in-situ growth of the mesoporous silica SBA-16 in 3), the thickness of the molecular sieve membrane is controlled to be between 30 and 60 μm.

12. The method of claim 2, wherein by adjusting components of the molecular sieve solution or repeating times of the in-situ growth of the mesoporous silica SBA-16 in 3), the thickness of the molecular sieve membrane is controlled to be between 30 and 60 μm.

13. The method of claim 5, wherein by adjusting components of the molecular sieve solution or repeating times of the in-situ growth of the mesoporous silica SBA-16 in 3), the thickness of the molecular sieve membrane is controlled to be between 30 and 60 μm.

14. The method of claim 6, wherein by adjusting components of the molecular sieve solution or repeating times of the in-situ growth of the mesoporous silica SBA-16 in 3), the thickness of the molecular sieve membrane is controlled to be between 30 and 60 μm.

* * * * *